G. M. RICHARDS.
PRESSURE GOVERNOR.
APPLICATION FILED MAY 1, 1907. RENEWED OCT. 31, 1911.

1,031,291.

Patented July 2, 1912.

3 SHEETS—SHEET 1.

Witnesses:
E. A. Volk.
A. G. Dimond.

Inventor.
George M. Richards,
by
Wilhelm Parker Hart Attorneys.

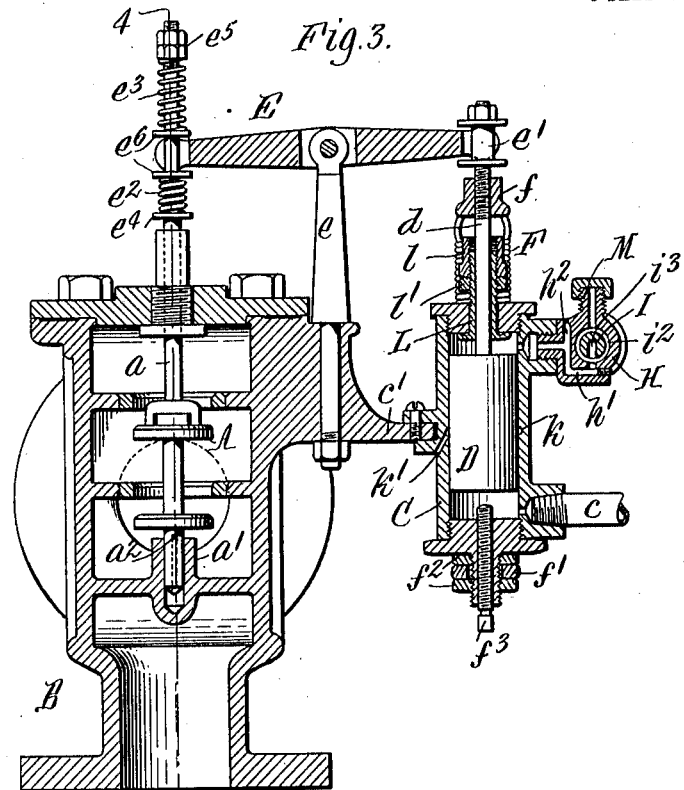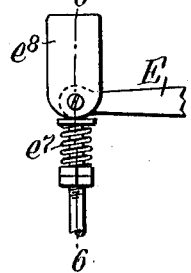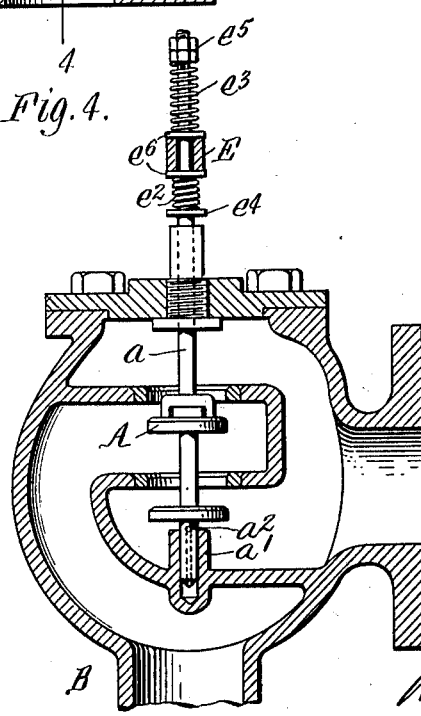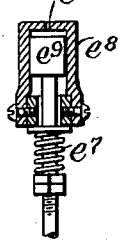

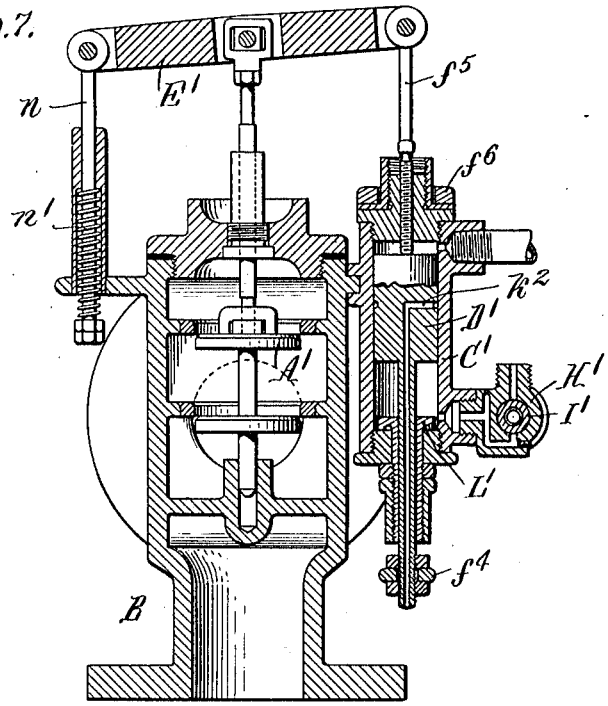
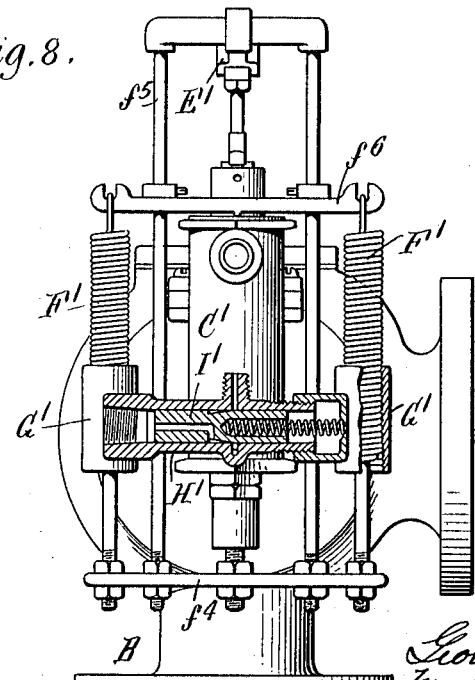

UNITED STATES PATENT OFFICE.

GEORGE M. RICHARDS, OF ERIE, PENNSYLVANIA, ASSIGNOR TO MARION A. RICHARDS, OF ERIE, PENNSYLVANIA.

PRESSURE-GOVERNOR.

1,031,291. Specification of Letters Patent. Patented July 2, 1912.

Application filed May 1, 1907, Serial No. 371,282. Renewed October 31, 1911. Serial No. 657,870.

*To all whom it may concern:*

Be it known that I, GEORGE M. RICHARDS, a citizen of the United States, residing at Erie, in the county of Erie and State of Pennsylvania, have invented a new and useful Improvement in Pressure-Governors, of which the following is a specification.

This invention relates to pressure governors of the kind employed for regulating the supply of motive fluid to pumping engines for controlling the speed of the engine as required under the varying conditions of load on the engine.

The primary object of the invention is to provide an efficient, sensitive and reliable pressure governor of simple construction which will increase the supply of motive fluid to the engine proportionately as the pressure of the pumped fluid increases, so as to maintain a practically uniform speed of the engine notwithstanding the increasing load thereon; which will slow down the engine without stopping it when the desired maximum pressure of the pumped fluid is exceeded; and which will also govern the engine to maintain a uniform speed notwithstanding fluctuations of pressure in the motive fluid.

More specific objects of the invention are to provide means of simple construction for adjusting the initial position of the valve and for regulating the valve's action so that the variations produced by it in the motive fluid supply will be in direct proportion to the fluctuations of load on the engine; to accomplish this last result by regulating the extensibility of the counter pressure springs for the governor piston; also to utilize the pressure of the motive fluid on the valve itself for governing against fluctuations in the pressure of the motive fluid; and also to provide an automatic pressure-operated device which permits a long stroke of the governor in its governing action prior to the attainment of the desired maximum pressure of the pumped fluid, and then acts automatically to shorten the stroke of the piston and valve to substantially maintain such maximum pressure and prevent stopping the engine.

Figure 1:
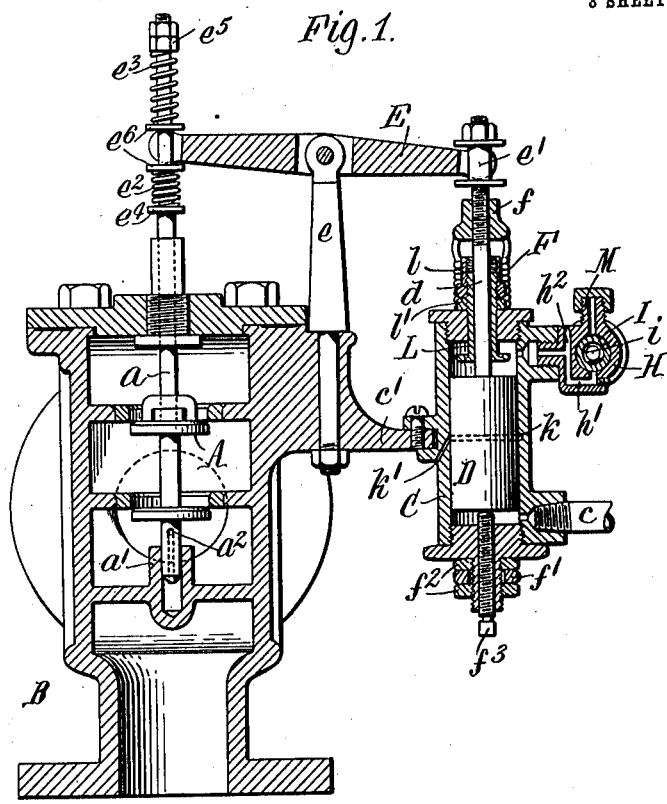
Figure 2:
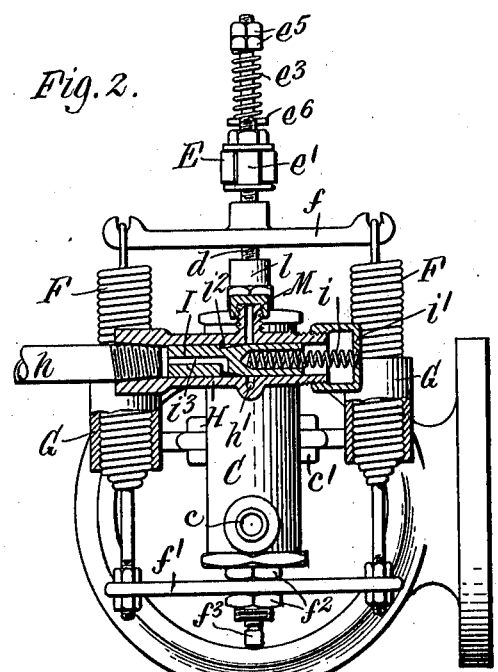

In the accompanying drawings, consisting of three sheets: Figure 1 is a sectional elevation of a pressure governor embodying the invention. Fig. 2 is an end elevation thereof, partly in section. Fig. 3 is a sectional elevation thereof, similar to Fig. 1, but showing a different position of the parts. Fig. 4 is a transverse sectional elevation thereof, in line 4—4, Fig. 3. Fig. 5 is a side elevation of a different form of yielding connection between the valve stem and governor lever. Fig. 6 is a sectional elevation thereof, in line 6—6, Fig. 5. Figs. 7 and 8 are views similar, respectively, to Figs. 1 and 2, of a governor of different construction.

Like letters of reference refer to like parts in the several figures.

A represents a valve which controls the supply of steam or other motive fluid to the engine for operating an air compressor or pump for other fluids, its casing B being located in the motive fluid supply pipe. For the sake of clearness the motive fluid will be hereinafter referred to as steam and the pumped fluid as air. The steam valve is of the so-called balanced type having two disks fixed on a stem $a$ and coöperating with two seats at opposite sides of the inlet passage of the valve casing. One end of the valve stem projects out of the casing for connection with the governor piston or motor, while the other end is guided in a bearing $a'$ in the casing to which the steam pressure is admitted, for instance, by a duct $a^2$ in the guide stem, and consequently the pressure on the valve tending to seat it proponderates over the opposing pressure tending to open the valve to an extent depending upon the cross-sectional area of the valve stem. This unbalanced pressure on the valve is utilized, as later explained, to automatically vary the valve opening according to the fluctuations in the steam or motive fluid pressure.

C represents a governor cylinder supplied through a suitable connection $c$ at one end with air at a pressure equal to or proportional to that prevailing in the receiver or system supplied by the pump, and D represents a piston in said cylinder acted upon by the air. In the construction shown in Figs. 1–4, the cylinder is secured to an arm or bracket $c'$ projecting from the valve casing, and the piston has a rod $d$ projecting through the upper end of the cylinder and connected to one end of a lever E which is fulcrumed between its ends on an upright post $e$ on the valve casing B and is connected at its opposite end to the steam valve stem. The lever is connected to the piston rod by a forked end and spool $e'$, or in any other suitable way, to cause the lever to move positively with the piston, while a yielding connection is provided between the lever and the valve stem, for which purpose the valve end of the lever is forked and straddles the valve stem between two springs $e^2$ $e^3$ surrounding the valve stem, and bearing, respectively, against a fixed collar $e^4$ and an adjustable nut $e^5$ on the stem. Loose washers $e^6$ are interposed between the springs and the lever. The strength of the springs $e^2$ $e^3$ is so proportioned relative to the normal steam pressure that, assuming the lever to be held from movement, the spring $e^2$ will tend to open the steam valve in opposition to the steam pressure thereon tending to close it, these opposing pressures being substantially balanced so long as the normal steam pressure obtains, so that the valve will only be moved by the operation of the governor piston. If, however, the steam pressure falls below the normal, the preponderating spring pressure will open the valve wider and admit more steam to the engine, whereas if the steam pressure rises above the normal, it will overcome the spring pressure and move the valve toward its seat to admit less steam to the engine. Thus the engine will run at a substantially uniform speed notwithstanding fluctuations in the steam pressure. The spring $e^3$ is principally employed to hold the lever at all times against the other spring $e^2$ and give a cushioning or dash pot effect.

If preferred, a dash pot could be substituted for the second spring $e^3$, as shown in Figs. 5 and 6, in which the governor lever bears against a spring $e^7$ corresponding to the spring $e^2$ described, and has a dash pot cylinder $e^8$ pivoted thereto. The valve stem protrudes through the lever and has a piston $e^9$ secured to it and working in the cylinder which has a small vent hole $e^{10}$. The air can only escape slowly from the dash pot cylinder in advance of the piston and so cushions its movements in a manner analogous to the second spring $e^3$ employed in the first construction.

F represents counterbalancing springs for opposing the movement of the governor piston by the air. Two of these springs are preferably employed connected at opposite ends to yokes $f$ $f'$. The yoke $f$ is screwed on or otherwise secured to the piston rod $d$, and the yoke $f'$ is secured on a threaded extension at the lower end of the governor cylinder between adjusting nuts $f^2$. By adjusting the yoke $f'$ the piston can be moved to secure the desired initial position of the steam valve which should be just open enough, as shown in Fig. 1, for driving the engine at the desired speed when not doing any work. A screw $f^3$ in the lower end of the governor cylinder, or other suitable stop is provided to limit the closing movement of the piston to prevent fully closing the valve and stopping the engine.

G, Fig. 2, represents internally threaded sleeves which are screwed on the counterbalancing springs F for regulating the extensibility thereof. By screwing these sleeves farther onto or off of the springs the latter will be rendered dead or inactive for a greater or less portion of their length and consequently will stretch less or more and permit a shorter or longer movement of the valves under a given pressure on the governor piston.

The operation of the governor as thus far described is as follows: In setting up the governor the yoke $f'$ is adjusted to secure an initial position of the valve, such as to give enough steam to the engine to drive it at the desired speed when the pressure of the air is zero. The engine is then allowed to run and the air acting on the governor piston will gradually lift it and open the valve wider and wider as the air pressure builds up. When the desired maximum pressure of the pumped fluid is obtained, the sleeves G are, if necessary, adjusted on the counterbalancing springs so that the air pressure on the governor piston will move it the required distance to give the proper valve opening for the same speed of the engine as when running light. The piston will then operate automatically to open or close the valve more or less in proportion to increments and decrements in the pumped fluid pressure and so maintain a practically constant speed of the engine. The steam valve will at the same time be influenced by fluctuations in the pressure of the steam as before explained, the steam pressure acting conjointly with air pressure to keep the engine speed constant.

The following means are employed for preventing the air pressure from rising above a predetermined maximum: H represents a cylinder to which the air is admitted through a suitable connection $h$ at one end thereof, and which is connected between its ends by a passage $h'$ with the upper end of the cylinder C, or end thereof opposite to the main air connection $c$. The cylinders C and H will be termed respectively the main and auxiliary cylinders to distinguish them. The auxiliary cylinder is preferably arranged horizontally and supported from the main cylinder by a connection containing the passage $h'$. A bleeder port $h^2$ connects said passage $h'$ with the atmosphere. I is a piston in the auxiliary cylinder, against one end of which the air pressure acts tending to move it in opposition to a spring $i$ preferably arranged in the cylinder between the other end of the piston and a screw-adjusting cap $i'$ on the end of the cylinder. The piston has a reduced conical or tapering waist forming a circumferential groove $i^2$ between its ends, and is provided with a passage $i^3$ for conducting the air to said groove. The spring $i$ normally holds the piston against movement by the air. When, however, the pressure thereof exceeds the desired maximum to be maintained, it will move said piston and pass through the piston passage $i^3$, groove $i^2$ passage $h'$ into the main cylinder to move the main piston in a direction to move the steam valve toward its seat and reduce the speed of the engine, thereby again reducing the air pressure to the desired maximum. The air pressure on the lower end of the main piston is nearly balanced by the opposing pressure of the counterbalancing springs F and comparatively little air pressure acting on the upper end of the piston supplementing the spring pressure will reverse the movement of the piston. The tapering groove $i^2$ in the auxiliary piston only gradually admits pressure to the main cylinder and the pressure is reduced by the escape of the air through the bleeder port $h^2$. Only a few pounds of air pressure is therefore employed to reverse the main piston when the desired maximum pressure of the pumped fluid is exceeded, and owing to this reduced pressure and the escape thereof through the bleeder port $h^2$ the main piston will respond quickly to relatively small variations in the air pressure above the desired maximum and will hold the pressure within a pound or two of the desired maximum. This would not be possible if the maximum receiver pressure were allowed to act directly on the main piston. The main cylinder is preferably provided between the ends of the piston with an internal groove $k$ and vent port $k'$, Fig. 1, to prevent the air pressure from leaking past the piston from one end to the other end thereof, or the piston itself could be provided with such a vent, as shown at $k^2$, Fig. 7.

L represents an automatic pressure-operated stop device for limiting the reverse movement of the main piston when the steam valve is operated thereby to prevent the air pressure from exceeding the desired maximum. This device consists preferably of a sleeve surrounding the main piston rod and having a sliding fit thereon in a hole in the head of the main cylinder. The end of the sleeve within the cylinder is enlarged or flanged, and on its outer end is screwed an adjustable extension sleeve or nut $l$ and a jam nut $l'$ for locking the extension nut in adjusted positions. When there is no pressure in the main cylinder on the stop sleeve, that is before the maximum pressure of the pumped fluid is reached, the sleeve can move with the piston and will not prevent the full stroke thereof, but when the air is admitted to the upper end of the cylinder by the auxiliary piston, the pressure will move the stop sleeve outwardly, seating its flange against the end of the cylinder, as shown in Fig. 3, so that the yoke $f$ secured to the main piston rod will strike the outer end of the sleeve and prevent a full reverse stroke of the piston. The pressure on the sleeve is less than on the piston, but it so far neutralizes the reversing pressure on the piston, which is slight anyway, as to arrest the piston. The steam valve cannot, therefore, be closed but is only moved toward its seat far enough to reduce the speed of the engine sufficiently to reduce the air pressure to the desired maximum. The stop sleeve has no effect when the air pressure is low and allows the full stroke of the piston at such times.

The auxiliary cylinder shown is provided with a steam connection M adapted to be placed in communication with the passage $h'$ leading to the primary cylinder, when the auxiliary piston is moved by the air pressure. In the normal action of the governor above described, this steam connection M is closed and performs no function. If desired, however, the air passage $i^3$ in the auxiliary piston can be plugged and the steam connection opened, when the auxiliary piston will operate in a similar manner to admit steam to the main cylinder instead of air, to prevent the receiver pressure from exceeding the desired maximum.

Figs 7 and 8 show another construction of the governor differing from that described principally in the following respects: The governor lever E' is connected centrally to the stem of the steam valve A', and at opposite ends to the governor piston D' and a fulcrum post $n$. The fulcrum post slides in a bearing on the valve casing and is provided with a spring $n'$ which acts in a manner analogous to the spring $e^2$ in the first construction, to allow the steam valve to move toward or from its seat if the steam pressure thereon rises above or falls below the normal. The governor piston D' is connected by a depending piston rod, yoke $f^4$ and links $f^5$ to the lever E' and the air pressure enters the top of the cylinder and moves the piston downwardly instead of upwardly, as in the other governor, to increase the steam valve opening as the air pressure increases. The counterbalancing springs F' connect the yoke $f^4$ to another yoke $f^6$ adjustably secured to the top of the main cylinder C'. This yoke $f^6$ is adjusted to determine the initial position of the valve, and the extensibility of the springs is regulated as before, by adjustable screw sleeves G' thereon. H' is the auxiliary cylinder and I' the auxiliary piston therein controlling admission of air to the lower end of the main cylinder for preventing the air pressure from exceeding the desired maximum. L' is the automatic pressure-operated stop sleeve for the main piston. This governor operates similarly to that described and performs the several functions thereof. The first construction is deemed preferable as it is somewhat simpler and the governor cylinder and springs are located farther from the valve casing so as to be affected less by the heat of the steam.

I claim as my invention:

1. In a pressure governor, the combination of a valve controlling the supply of motive fluid to an engine, a device actuated by the pumped fluid pressure, and elastic means interposed between said valve and said device and acting on the valve in opposition to the motive fluid pressure on the valve, the pressure of said elastic means being so proportioned relative to the motive fluid pressure that fluctuations in the motive fluid pressure will vary the position of the valve, substantially as set forth.

2. In a pressure governor, the combination of a valve controlling the supply of motive fluid to an engine, a device actuated by the pumped fluid pressure, and a spring interposed between said valve and said device and tending to open the valve in opposition to the motive fluid pressure on the valve tending to close it, the spring pressure being so proportioned relative to the motive fluid pressure that fluctuations in the motive fluid pressure will vary the position of the valve, substantially as set forth.

3. In a pressure governor, the combination of a valve controlling the supply of motive fluid to an engine, a device actuated by the pumped fluid pressure, a spring interposed between said valve and said device and tending to open the valve in opposition to the motive fluid pressure on the valve tending to close it, the spring pressure being so proportioned relative to the motive fluid pressure that fluctuations in the motive fluid pressure will vary the position of the valve, and cushioning means coöperating with said spring, substantially as set forth.

4. In a pressure governor, the combination of a valve and its chamber for controlling the supply of motive fluid to an engine, a device actuated by the pumped fluid pressure for varying the valve opening in accordance with fluctuations in the pumped fluid pressure, and a yielding connection between said valve and said device for automatically varying the valve opening by fluctuations of the motive fluid pressure in the valve chamber, substantially as set forth.

5. In a pressure governor, the combination of a valve controlling the supply of motive fluid to an engine, a device operated by the pumped fluid pressure for shifting the valve in accordance with variations in said pressure, and means coöperating with the motive fluid pressure acting on said valve to shift the valve in accordance with fluctuations in said motive fluid pressure, substantially as set forth.

6. The combination of a valve controlling the supply of motive fluid to a pumping engine, a primary device operated by the pumped fluid pressure for gradually opening said valve wider as the pressure increases, and a normally inactive auxiliary device which is operated by said pumped fluid pressure when it reaches a predetermined value and which admits fluid to said primary device at a pressure which is materially less than the pressure which operates said auxiliary device for producing a slight regulating movement of said primary device in opposition to the before mentioned pressure thereon to partially but not completely close said valve, substantially as set forth.

7. The combination of a valve controlling the supply of motive fluid to an engine, means coöperating with the motive fluid pressure acting on said valve for shifting the valve in accordance with fluctuations in said motive fluid pressure, means operated by the pumped fluid pressure and connected to said valve for shifting the same in accordance with variations in the fluid pressure produced by said engine, and a normally inactive auxiliary device operated by the fluid pressure produced by said engine to shift said valve when a predetermined pressure is reached, substantially as set forth.

8. In a pressure governor, the combination of a valve controlling the supply of motive fluid to a pumping engine, a primary device which is moved in one direction by the pumped fluid pressure to operate said valve to increase the supply of motive fluid to the engine as said pumped fluid pressure increases, a normally inactive auxiliary device which is operated by the pumped fluid pressure when said pressure reaches a predetermined value and which admits fluid to said primary device at a pressure which is materially less than the pressure which operates said auxiliary device for reversing the motion of said primary device to operate said valve to decrease the supply of motive fluid to the engine, and means for preventing said valve from completely closing, substantially as set forth.

9. In a pressure governor, the combination of a valve controlling the supply of motive fluid to a pumping engine, a primary device which is moved in one direction by the pumped fluid pressure to operate said valve to increase the supply of motive fluid to the engine as said pumped fluid pressure increases, a normally inactive auxiliary device which is operated by the pumped fluid pressure when said pressure reaches a predetermined value and which admits the pumped fluid to said primary device at a pressure which is materially less than the pressure which operates said auxiliary device for producing a slight reversing motion of said primary device to operate said valve to decrease the supply of motive fluid to the engine, substantially as set forth.

10. In a pressure governor, the combination of a pressure-operated device, a counterbalancing spring therefor having one end fastened and the other end secured to a movable part of said governor, and means for rendering more or less of said spring inactive, consisting of a hollow sleeve which is connected only to said spring and is adjustable lengthwise on said spring and has means for engaging and holding a greater or less number of coils of the spring, substantially as set forth.

11. In a pressure governor, the combination of a pressure-operated device, a counterbalancing coil spring therefor, and a part which has an adjustable screw connection with the coils of said spring and is connected only to said spring whereby it can be screwed farther onto or off of said spring for regulating the elasticity thereof, substantially as set forth.

12. In a pressure governor, the combination of a pressure-operated device, a counterbalancing coil spring therefor, and an internally threaded sleeve having a screw engagement with the coils of said spring, substantially as set forth.

13. In a pressure governor, the combination of a pressure-operated piston, a cylinder therefor, and an automatic stop for limiting the stroke of said piston consisting of a movable part having a portion exposed to the pressure in said cylinder and adapted to engage a part connected to said piston, substantially as set forth.

14. In a pressure governor, the combination of a cylinder, a piston therein having a projecting piston rod, and a stop sleeve surrounding said piston rod and having one end exposed to pressure in said cylinder and adapted to be moved outwardly by pressure in the cylinder between said piston and the inner end of said sleeve to engage a part connected to said piston for limiting its stroke, substantially as set forth.

15. In a pressure governor, the combination of a cylinder, a piston therein, means for admitting pressure to said cylinder at opposite ends of said piston to move the piston in opposite directions, and an automatic stop device which is operated by the pressure at one end of said piston to limit the stroke of the piston by such pressure, substantially as set forth.

Witness my hand, this 29th day of April, 1907.

GEORGE M. RICHARDS.

Witnesses:
C. W. PARKER,
E. C. HARD.

---

Copies of this patent may be obtained for five cents each, by addressing the "Commissioner of Patents, Washington, D. C."